US012759366B2

(12) United States Patent
Hartlieb

(10) Patent No.: US 12,759,366 B2
(45) Date of Patent: Oct. 13, 2026

(54) HYDRAULIC SYSTEM FOR DAMPING CONTROL

(71) Applicant: Dr. Ing. h.c. F. Porsche Aktiengesellschaft, Stuttgart (DE)

(72) Inventor: Stefan Hartlieb, Filderstadt-Plattenhardt (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 385 days.

(21) Appl. No.: 18/390,088

(22) Filed: Dec. 20, 2023

(65) Prior Publication Data

US 2024/0278614 A1 Aug. 22, 2024

(30) Foreign Application Priority Data

Feb. 16, 2023 (DE) ..................... 10 2023 103 777.3

(51) Int. Cl.
*B60G 17/08* (2006.01)
*B60G 13/08* (2006.01)

(52) U.S. Cl.
CPC ............ *B60G 17/08* (2013.01); *B60G 13/08* (2013.01); *B60G 2202/24* (2013.01); *B60G 2202/415* (2013.01); *B60G 2206/91* (2013.01)

(58) Field of Classification Search
CPC .... B60G 17/08; B60G 13/08; B60G 2202/24; B60G 2202/415; B60G 2206/91; B60G 2202/416; B60G 2204/201; F15B 21/008; F16F 2230/06
See application file for complete search history.

(56) References Cited

U.S. PATENT DOCUMENTS

| | | | | |
|---|---|---|---|---|
| 7,635,051 | B2 | 12/2009 | Beck | |
| 8,355,840 | B2 | 1/2013 | Ammon et al. | |
| 2015/0191069 | A1* | 7/2015 | Zuleger | F16F 9/5123 280/124.16 |
| 2019/0389271 | A1* | 12/2019 | Zanziger | B60G 17/08 |

(Continued)

FOREIGN PATENT DOCUMENTS

| | | | |
|---|---|---|---|
| DE | 102004034106 | B3 | 8/2005 |
| DE | 102015114681 | A1 | 3/2017 |

(Continued)

OTHER PUBLICATIONS

German Patent No. DE 102021202237 to Beilner et al published on Sep. 15, 2022.*

*Primary Examiner* — Pamela Rodriguez
(74) *Attorney, Agent, or Firm* — Buchanan Ingersoll & Rooney PC

(57) ABSTRACT

A hydraulic system for the preferably active damping control of a motor vehicle. The system includes at least one damper, with which a damper shutoff member is associated and to which at least one hydraulic line is hydraulically connected. In order to simplify the assembly of the hydraulic damper, an end of the hydraulic line facing the damper is equipped with a line shutoff member, wherein the line shutoff member at the end of the hydraulic line facing the damper is integrated into a line connection block, which is secured in a hydraulically sealed but releasable manner to a damper connection block by the damper shutoff member being merged, along with a filling member, into a combined filling valve which is integrated into the damper connection block.

9 Claims, 5 Drawing Sheets

(56) References Cited

U.S. PATENT DOCUMENTS

| | | | | |
|---|---|---|---|---|
| 2020/0040960 | A1 | 2/2020 | Woenarta | |
| 2023/0113777 | A1* | 4/2023 | Vandersmissen .... | B60G 21/073<br>701/37 |

FOREIGN PATENT DOCUMENTS

| | | | |
|---|---|---|---|
| DE | 102018118911 | A1 | 2/2020 |
| WO | 2008022697 | A1 | 2/2008 |

* cited by examiner

HYDRAULIC SYSTEM FOR DAMPING CONTROL

CROSS-REFERENCE TO RELATED APPLICATION

This application claims priority to German Patent Application No. 10 2023 103 777.3, filed Feb. 16, 2023, the content of such application being incorporated by reference herein in its entirety.

FIELD OF THE INVENTION

The invention relates to a hydraulic system for the preferably active damping control of a motor vehicle, said system comprising at least one damper, with which a damper shutoff member is associated and to which at least one hydraulic line is hydraulically connected. The invention further relates to a method for assembling such a hydraulic system.

BACKGROUND OF THE INVENTION

German patent DE 10 2004 034 106 B3, which is incorporated by reference herein, discloses a suspension system for motor vehicles with level control for adjusting a predetermined height of the vehicle structure, whereby a pump and a piston-cylinder genset are prefilled with a damping means. German patent DE 10 2015 114 681 B4, which is incorporated by reference herein, discloses a suspension apparatus for a motor vehicle having spring struts, each comprising a lift system and connected together via pressure lines, whereby a hydraulic space of an actuator of a spring strut is prefilled with hydraulic oil, whereby, during assembly, the quantity of oil from the actuator is pushed into empty lines to extract air from them by spring pretensioning of the actuator. German patent application DE 10 2018 118 911 A1, which is incorporated by reference herein, discloses a vibration damper comprising a shutoff valve, via which the vibration damper can be prefilled. International patent application WO 2008/022697 A1, which is incorporated by reference herein, discloses a hydropneumatic spring or damper assembly having a spring valve that can be utilized to fill, drain, or shut off a pressure space of a piston-cylinder assembly of the damper assembly.

SUMMARY OF THE INVENTION

It would be desirable is to simplify the assembly of a hydraulic damper in a motor vehicle having a preferably active damping control.

In a hydraulic system for the preferably active damping control of a motor vehicle, said system comprising at least one damper, with which a damper shutoff member is associated and to which at least one hydraulic line is hydraulically connected, an end of the hydraulic line facing the damper is equipped with a line shutoff member, whereby the line shutoff member at the end of the hydraulic line facing the damper is integrated into a line connection block, which is secured in a hydraulically sealed but releasable manner to a damper connection block by the damper shutoff member being merged, along with a filling member, into a combined filling valve which is integrated into the damper connection block. The filling valve could otherwise also be integrated into a shutoff screw of the hydraulic line or placed in another location. The motor vehicle preferably comprises four wheels, each associated with a hydraulic damper, which will be referred to in abbreviated fashion as a damper. The hydraulic damper constitutes a shock absorber in an active chassis of a motor vehicle. The hydraulic medium is preferably a hydraulic fluid, which will also be referred to as a hydraulic oil or abbreviated as "oil". In addition to the hydraulic damper volume, the hydraulic damper comprises a gas reservoir having a compensation volume. The damping control preferably relates to an active damping control. However, the damping control can also be a semi-active or passive damping control. The preferably active damping control preferably comprises a hydraulic actuator apparatus, which is hydraulically connected to the damper via the at least one hydraulic line, preferably via a hydraulic line system. The hydraulic actuator apparatus in the active chassis of the motor vehicle is used to actively stimulate or drive the hydraulic dampers in a targeted manner. To this end, the hydraulic actuator apparatus advantageously comprises a separate hydraulic pump for each damper. Advantageously, two hydraulic pumps are combined together in each axle of the motor vehicle into one motor-pump unit. The hydraulic pumps associated with the respective axle are advantageously controllable separately via a common control unit. Prefilling is also conceivable if there were not a common motor pump unit, but each damper hydraulic circuit would have its own hydraulic pump and control unit. The hydraulic medium, using which the preferably active damping control in the active chassis of the motor vehicle is operated, should contain as little air as possible. A limited amount of air can be dissolved in the hydraulic medium. If the hydraulic medium contains too much air, the latter must be removed from the hydraulic medium at a suitable location, e.g., by deaeration. Appropriate equipment, e.g., deaeration valves, must be provided for deaeration. In the hydraulic system, the additional effort involved in the manufacture of the hydraulic line comprising the line connection block is deliberately taken into consideration in order to optimize the manufacture and assembly with regard to the manufacture of the hydraulic components of the hydraulic system at different manufacturing sites. The hydraulic system can effectively reduce the amount of work during production. In particular, shortened cycle times are enabled. In addition, capital costs can be reduced at the production site because, advantageously, filling equipment is no longer needed during the manufacturing process.

One preferred embodiment of the hydraulic system is characterized in that the damper shutoff member in the damper terminating block and the line shutoff member in the line connection block constitute metallic seals in their closed positions. The metallic seals ensure a stable and also permanently tight sealing of both the hydraulic line and the damper when these are prefilled with hydraulic medium. Further exemplary embodiments include a ball valve or a sealing concept via O-rings. However, the metallic seals provide the advantage that they are simple and inexpensive as well as space-saving.

Another preferred embodiment of the hydraulic system is characterized in that the damper shutoff member and the line shutoff member are designed as shutoff screws. The shutoff screws are simple and inexpensive to manufacture. Moreover, the shutoff screws are easily manually actuable during the assembly of the hydraulic system.

Another preferred embodiment of the hydraulic system is characterized in that the damper shutoff member comprises a central through-hole, which is used to constitute the filling member in the combined filling valve. In the combined filling valve, the damper shutoff member having the central through-hole constitutes a special shutoff screw, via which the hydraulic system can be filled with a hydraulic medium as needed, in particular for maintenance purposes.

A further preferred embodiment of the hydraulic system is characterized in that the central through-hole is closed in a hydraulically sealed but releasable manner by means of a sealing screw at an end of the filling member projecting from the damper connection block. In the combined filling valve, a conventional shutoff screw is combined with an additional sealing screw to achieve the desired function.

A further preferred embodiment of the hydraulic system is characterized in that the filling member features an outer multi-angle profile on its end projecting from the damper connection block, whereby the sealing screw features an outer multi-angle profile or an inner multi-angle profile. As a result, manual actuation of the combined filling valve for both shutoff and filling of the damper in the hydraulic system is easily enabled.

Another preferred embodiment of the hydraulic system is characterized in that the damper connection block and the line connection block, in their attached state, restrict a fluid passage bounded by the line shutoff member and the damper shutoff member when the line shutoff member and the damper shutoff member are in their closed positions. In particular, assembly of the prefilled hydraulic components is simplified as a result. The connection blocks are advantageously releasably secured to one another by means of suitable screw connections. The term “releasable” means repeatedly, non-destructively separable within the scope of the hydraulic system. The fluid passage is used to connect the damper to the hydraulic line when the line shutoff member and the damper shutoff member are in their open positions. The fluid passage constitutes an intermediate volume, which is filled with hydraulic medium before the hydraulic system is put into operation.

A method for assembling a previously described hydraulic system described is alternatively or additionally achieved by prefilling a hydraulic line volume of the hydraulic line and a hydraulic damper volume of the damper with a hydraulic medium prior to the damper and/or the hydraulic line being preassembled or assembled. When assembling or preassembling the prefilled hydraulic components, the two shutoff screws are closed. The shutoff screws are not opened until the two connection blocks are tightly connected to each other.

A method for assembling a previously described hydraulic system is alternatively or additionally achieved by the hydraulic line volume of the hydraulic line and a hydraulic damper volume of the damper being filled with a hydraulic medium only after the preassembly or assembly of the damper and/or the hydraulic line. This is advantageous if, e.g., the different hydraulic components are not prefilled, or if both hydraulic components, i.e., the damper and the hydraulic line, are manufactured at the same manufacturing site. The two hydraulic components can then be prefilled together.

The previously described invention further relates to a damper, a hydraulic line, a damper connection block, a line connection block, a combined filler valve, in particular a damper shutoff member, and a sealing screw, and/or a line shutoff member for a previously described hydraulic system. The specified parts can be purchased separately.

The invention optionally also relates to a motor vehicle having a previously described hydraulic system for the preferably active damping control in operation of the motor vehicle, whereby at least one hydraulic damper is assembled according to a previously described method.

BRIEF DESCRIPTION OF THE DRAWINGS

Further advantages, features, and details of the invention arise from the following description, in which various exemplary embodiments of the invention are described in detail with reference to the drawing.

DETAILED DESCRIPTION OF THE INVENTION

Figure 2:
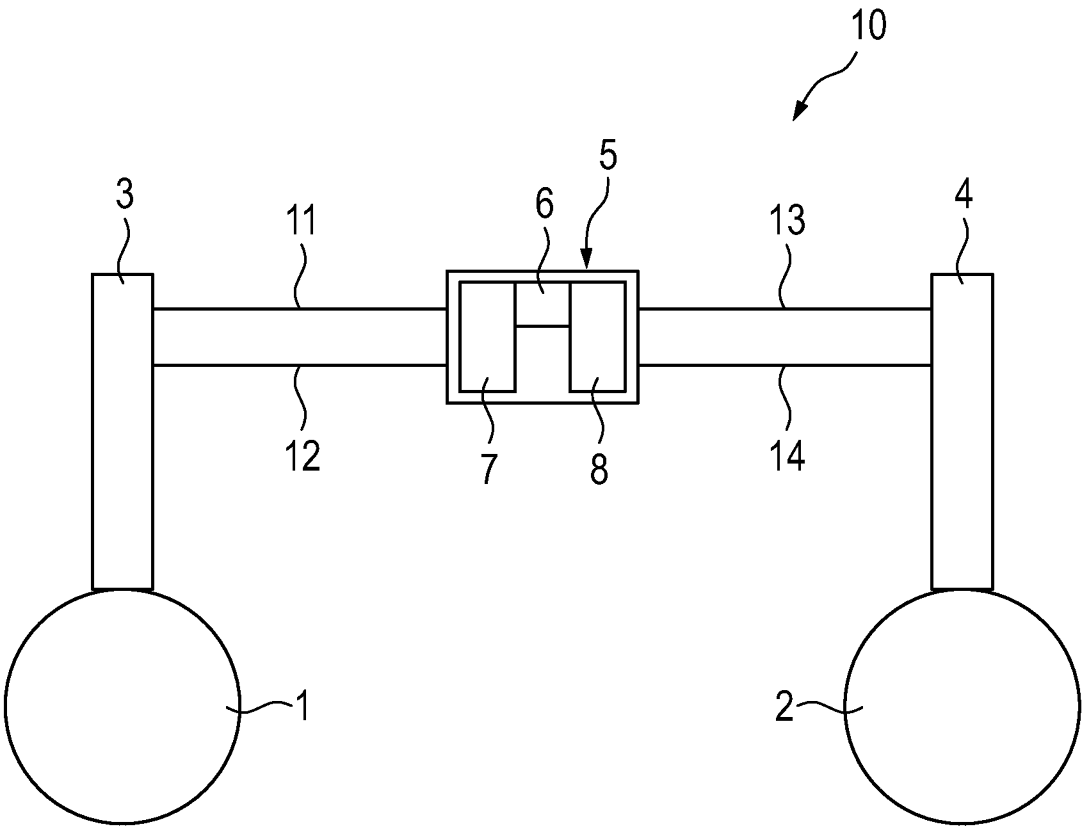
FIG. 2 is a schematic illustration of an axis of a motor vehicle comprising a hydraulic actuator apparatus, which is hydraulically connected via hydraulic lines to two hydraulic dampers, each associated with one wheel on the axle of the motor vehicle.

In FIG. 2, two wheels 1, 2 of an axis of a motor vehicle are indicated only by two circles. Rectangles indicate two hydraulic dampers 3, 4 that are associated with the two wheels 1, 2. The hydraulic dampers 3, 4, in combination with a hydraulic actuator apparatus 5, are used to constitute a hydraulic system 10 for active damping control during operation of the motor vehicle.

The hydraulic actuator apparatus 5 comprises two hydraulic pumps 7, 8, which can be controlled separately via a common electrical controller 6. The hydraulic pump 7 is hydraulically connected to the hydraulic damper 3 (also abbreviated as “damper”) via hydraulic lines 11, 12. The hydraulic pump 8 is hydraulically connected in a similar manner to the damper 4 via the hydraulic lines 13, 14.

Figure 1:
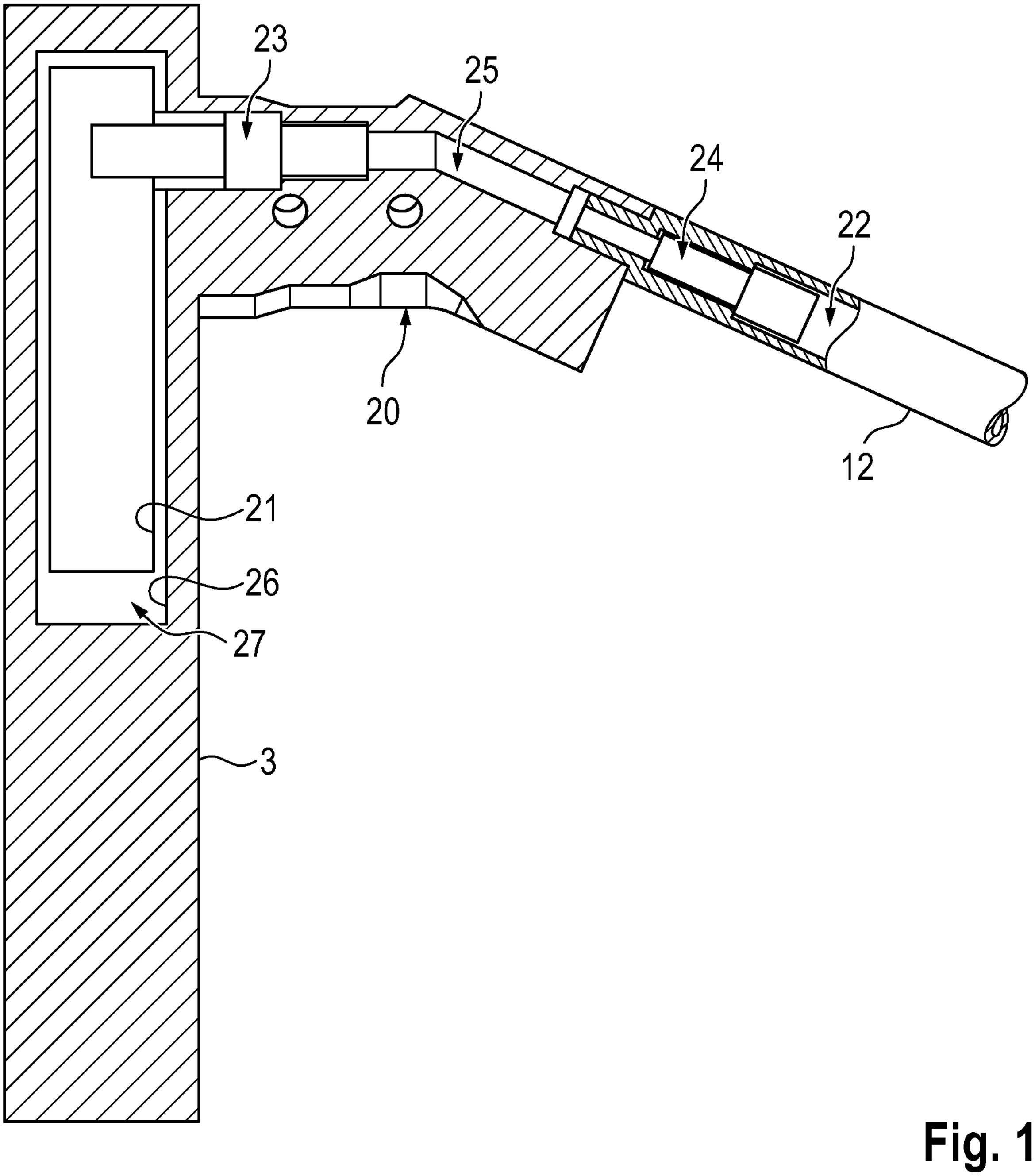
FIG. 1 is a schematic cross-sectional diagram of a hydraulic damper with a hydraulic line hydraulically connected thereto.

FIG. 1 also schematically shows how the hydraulic damper 3 is hydraulically connected to the hydraulic line 12 during assembly. The hydraulic connection between the damper 3 and the hydraulic line 12 is illustrated by way of a connection device 20. The connection device 20 is attached to the damper 3.

The connection device 20 comprises, e.g., a connection valve block. The connection valve block comprises, e.g., a shutoff valve having a shutoff member 23. Using the shutoff member 23, a damper volume 21 including a hydraulic medium can be enclosed in the damper 3.

The end of the hydraulic line 12 connected to the connection device 20 further comprises a shutoff valve comprising a shutoff member 24. Using the shutoff member 24, a line volume 22 can be hydraulically enclosed in the hydraulic line 12.

The hydraulic line 12 is, e.g., fluidically connected to the connection means 20 of the damper 3 via a plug-in connector. An intermediate volume 25 is enclosed between the two shutoff members 23, 24 insofar as the two shutoff members 23, 24 are closed.

In FIG. 1, the damper volume in the damper 3 is indicated by a rectangle 21. A further rectangle indicates an assembly overfill volume 26 in the damper 3. The assembly overfill volume 26 is greater than the damper volume 21 of the damper 3.

As indicated, the damper 3 is overfilled with more hydraulic medium in order to generate a hydraulic pressure in the prefilled damper 3 that is greater than a hydraulic pressure in hydraulic line 12, which was also prefilled. The desired differential pressure is generated by means of a differential volume 27 in the damper 3, which is preferably precisely measured. It is also possible, e.g., given very soft hoses and a very low intermediate volume, to overfill the hydraulic lines or a line assembly comprising the motor pump unit with more hydraulic medium.

The damper 3 comes prefilled from a first supplier and is sealed by the shutoff member 23. The damper 3 is filled with the same hydraulic medium as the hydraulic line 12.

The actuator apparatus (designated as 5 in FIG. 2), along with the hydraulic line 12, is filled with the hydraulic medium by a second supplier. However, after prefilling the hydraulic line 12, the hydraulic pressure is less than the hydraulic pressure in damper 3. The hydraulic line 12 is closed after prefilling at the second supplier by the shutoff assembly 24.

Assembly of the damper 3 and the actuator apparatus having the hydraulic line 12 is performed by the vehicle manufacturer. First, for example, the actuator apparatus comprising the hydraulic lines, including the hydraulic line 12, is assembled in the motor vehicle. The damper 3 is then, e.g., assembled in the motor vehicle. The shutoff members 23, 24 are closed in this case.

The intermediate volume 25 contains air. After a hydraulic connection achieved by, e.g., mating the hydraulic line 12 via the connection device 20 with the damper 3, the intermediate volume 25 containing air is enclosed between the closed shutoff devices 23 and 24.

By opening the shutoff members 23, 24, the intermediate volume 25 filled with air can be compensated for upon completion of assembly. The air present in the intermediate volume 25 passes into solution in the hydraulic medium. This compensation procedure is advantageously achieved by means of the differential volume 27 and the associated greater hydraulic pressure in the damper 3.

Figure 3:
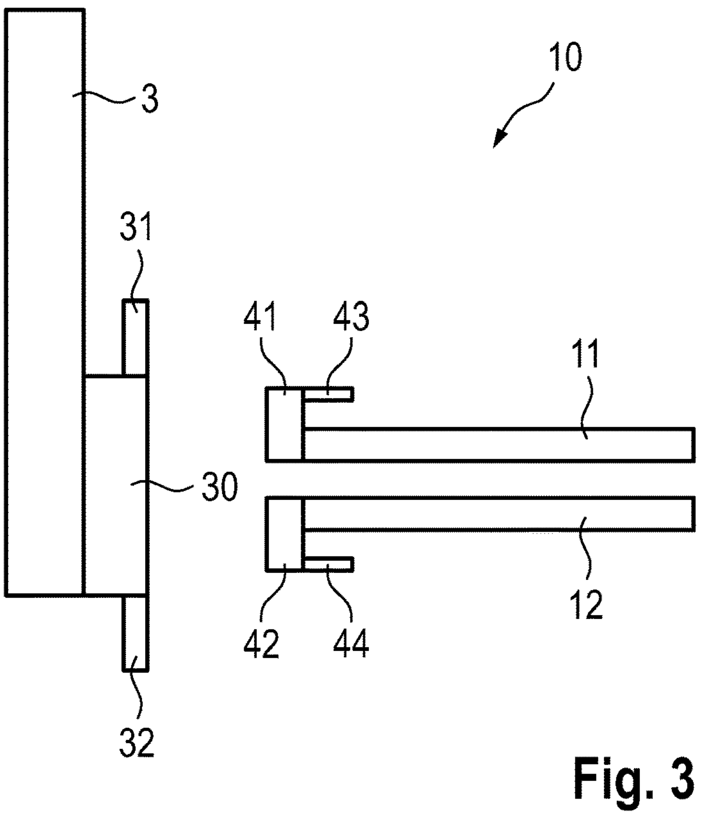
FIG. 3 is a schematic illustration of a hydraulic system comprising the damper and two hydraulic lines prior to assembly.
Figure 4:
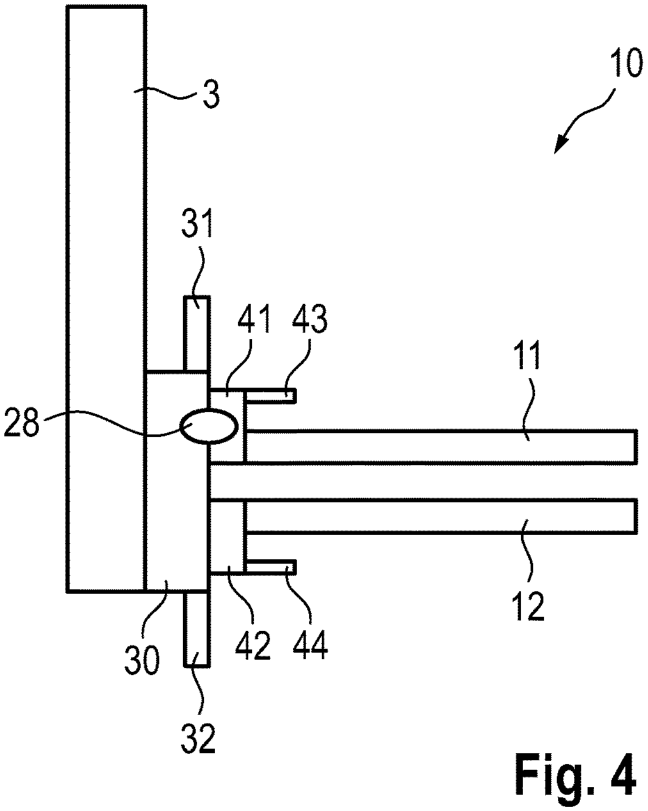
FIG. 4 depicts the hydraulic system in FIG. 3 in the assembled state.

In FIGS. 3 and 4, the hydraulic system 10 comprising the damper 3 and the two hydraulic lines 11, 12 are shown schematically before assembly and in the assembled state. The individual hydraulic components of the hydraulic system 10 are indicated only by rectangles. The intermediate volume (designated in FIG. 2 as 25) is indicated by an ellipse 28.

Provided on the damper 3 is a damper connection block 30, in which two combined filling valves 31, 32 are integrated. The term "integrated" with respect to the combined filling valves 31, 32, means that they are partially arranged inside the damper connection block 30. A part of the combined filling valves 31, 32 projects from the damper connection block 30, as seen in FIGS. 3 and 4.

At their ends facing the damper 3, the hydraulic lines 11, 12 each comprise a line connection block 41, 42. A line shutoff member 43, 44 is integrated into each of the line connection blocks 41, 42. In this context, the term "integrated" also means that part of the line shutoff members 43, 44 are arranged in the respective line connection block 41, 42. Another part of the line shutoff organs 43, 44 project from the respective line connection block 41, 42, as seen in FIGS. 3 and 4.

The hydraulic components 3 and 11, 12 of the hydraulic system 10 can be prefilled prior to assembly. In this case, the hydraulic components are advantageously sealed by means of the shutoff members 31, 32 and 43, 44. During assembly, the line connection blocks 41, 42, for example, are fixedly and tightly secured to the damper connection block 30 by means of screw connections. A fluid passage between the respective hydraulic line 11, 12 and the damper 3 is thereby sealed by the shutoff members 31, 32 and 43, 44. The intermediate volume 28 is released upon opening of the shutoff members 31, 32 and 43, 44.

Figure 5:
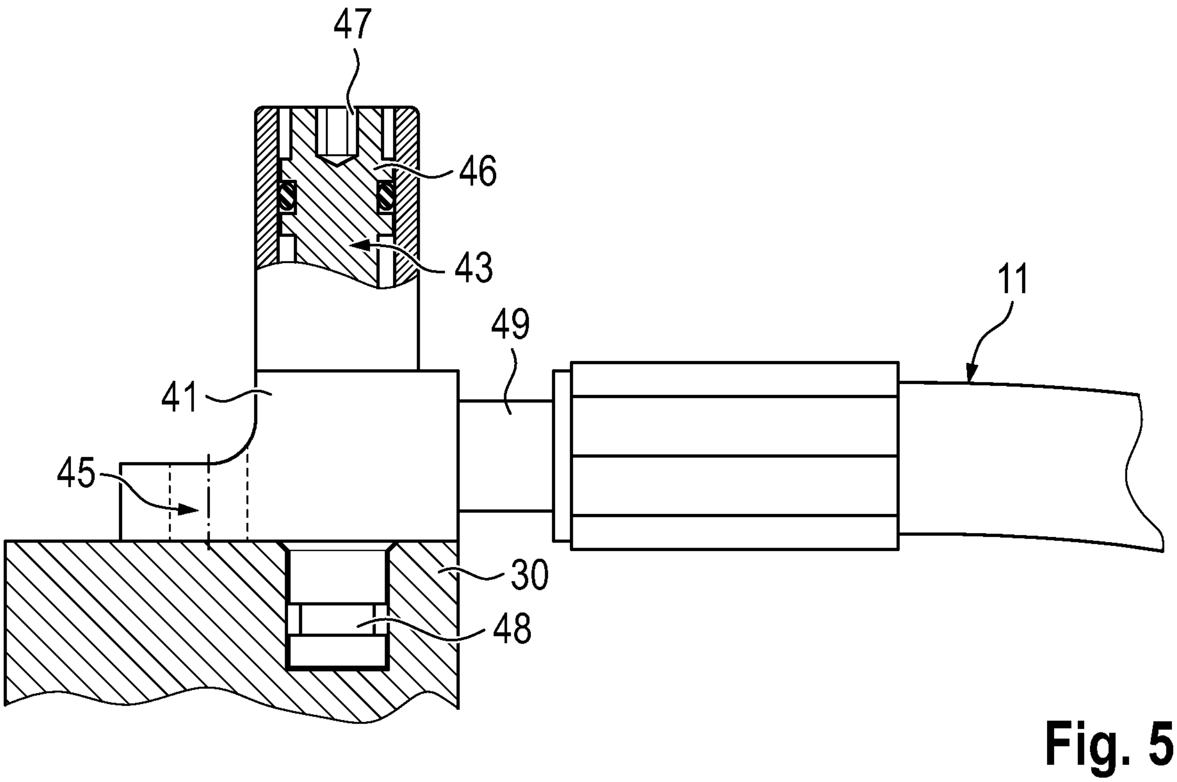
FIG. 5 is an enlarged and detailed illustration of a section in FIG. 4 with a line shutoff member.

As seen in FIG. 5, the line connection block 41 is provided at one end 49 of the hydraulic line 11. At the top of FIG. 5, the line shutoff member 43 projects from the line connection block 41. At the bottom of FIG. 5, a connection nipple 48 projects from the line connection block 41. The connection nipple 48 is used to connect the line connection block 41 to the damper connection block 30 in a hydraulically sealed manner.

During assembly, the line connection block 41 is releasably secured to the damper connection block 30 by means of the screw connection 45 (indicated only by dashes). The line shutoff member 43 is designed as a shutoff screw 46. The shutoff screw 46 can be manually actuated via an inner hexagonal tool 47.

The combined filling valves 31, 32 each comprise a damper shutoff member 33, which is designed as a shutoff screw. The combined filling valve 31, 32 also enables filling of the damper or hydraulic lines when connected to the damper.

Figure 6:
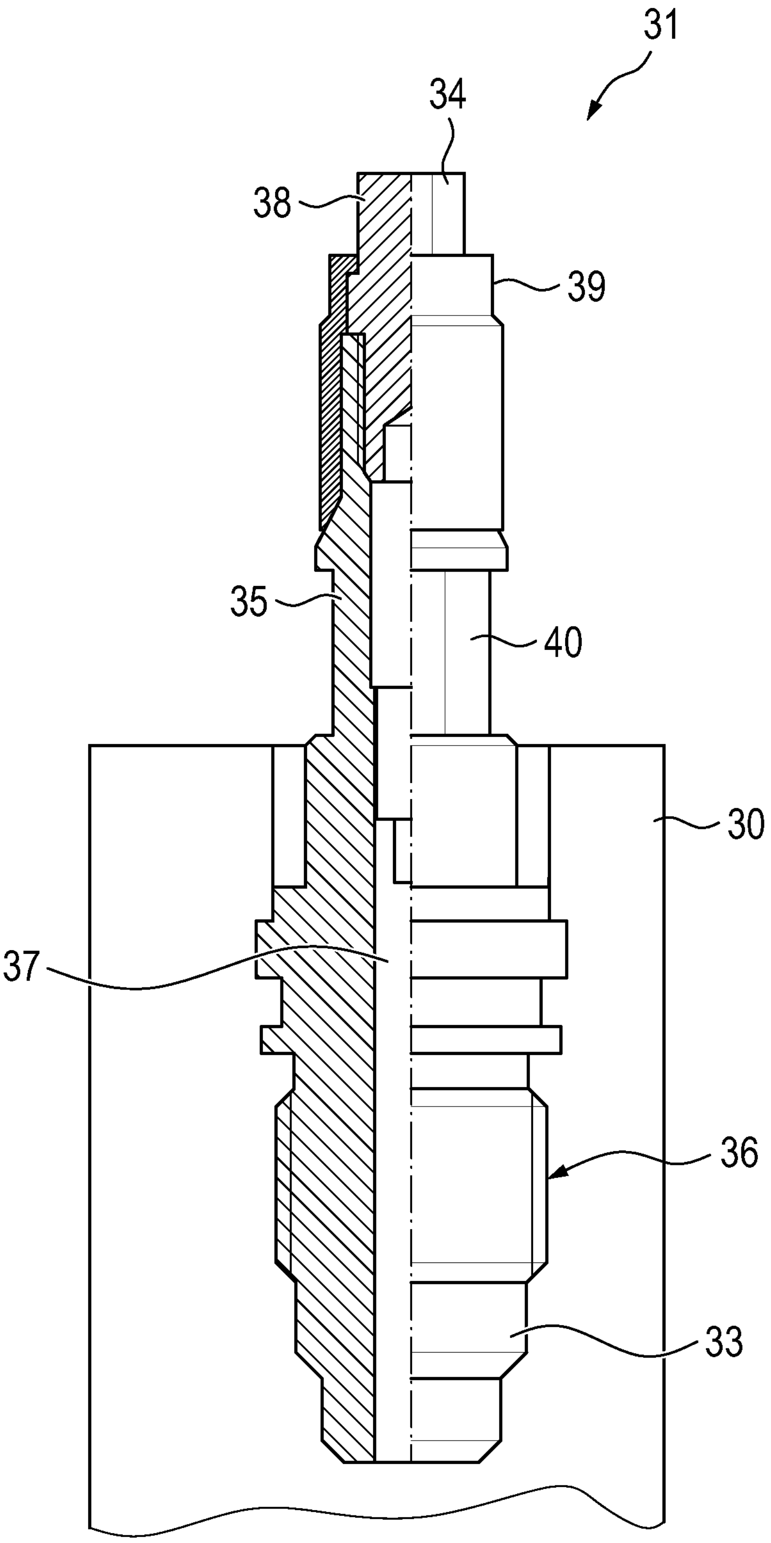
FIG. 6 is a further enlarged and detailed section from FIG. 4 with a combined filling valve.

It can be seen in FIG. 6 that the damper shutoff member 33 in the combined filling valve 31 is combined with a filling member 35. The damper shutoff member 33 is equipped as a shutoff screw 36 having an outer multi-edge profile 40. To constitute the filling member 35, the shutoff screw 36 is equipped with a central through-hole 37.

The central through-hole 37 is tightly sealed by a valve insert in the filling member 35. This valve insert counteracts the system pressure. The valve insert in the central through-hole 35 is protected from environmental factors by a sealing screw 38. The sealing screw 38 can therefore also be referred to as a dust protection cap. The sealing screw 38 can be actuated via an outer multi-edge profile 34.

The sealing screw 38 having the outer multi-edge profile 34 is designed to have a small diameter small enough that the outer multi-edge profile 40 can be reached with a tool, even when the closing screw 38 is assembled. In addition, the geometry of the combined filling valve 31 is selected such that a filling adapter can be attached, even in the closed position.

As seen in FIG. 6, the combined filling valve 31 projects far enough from the damper connection block 30 that both the outer multi-edge profile 40 and the outer multi-edge profile 34 are accessible by a suitable actuating tool.

What is claimed is:

1. A hydraulic system for active damping control of a motor vehicle, said system comprising:

at least one damper, with which a damper shutoff member is associated and to which at least one hydraulic line is hydraulically connected, wherein an end of the hydraulic line facing the damper includes a line shutoff member, wherein the line shutoff member at the end of the hydraulic line facing the damper is integrated into a line connection block, wherein the line connection block is secured in a hydraulically sealed but releasable manner to a damper connection block by the damper shutoff member, wherein the damper shutoff member is merged, along with a filling member, into a combined filling valve which is integrated into the damper connection block, wherein the damper shutoff member comprises a central through-hole which constitutes the filling member in the combined filling valve.

2. The hydraulic system according to claim 1, wherein, in closed positions of the damper shutoff member and the line shutoff member, the damper shutoff member and the line shutoff member constitute metallic seals.

3. The hydraulic system according to claim 1, wherein the damper shutoff member and the line shutoff member are shutoff screws.

4. The hydraulic system according to claim 1, wherein the central through-hole is sealed by a sealing screw in a hydraulically sealed but releasable manner at an end of a filling organ projecting from the damper connection block.

5. The hydraulic system according to claim 4, further comprising an outer multi-edge profile at an end of the filling member, the outer multi-edge profile projecting from the damper connection block, wherein the sealing screw includes an outer multi-edge profile.

6. The hydraulic system according to claim 1, wherein when the damper connection block is secured to the line connection block, the damper connection block and the line connection block restrict a fluid passage that is restricted by the line shutoff member and the damper shutoff member when the line shutoff member and the damper shutoff member assume closed positions.

7. A motor vehicle comprising the hydraulic system of claim 1.

8. In a hydraulic system comprising at least one damper, with which a damper shutoff member is associated and to which at least one hydraulic line is hydraulically connected, wherein an end of the hydraulic line facing the damper includes a line shutoff member, wherein the line shutoff member at the end of the hydraulic line facing the damper is integrated into a line connection block, wherein the line connection block is secured in a hydraulically sealed but releasable manner to a damper connection block by the damper shutoff member, wherein the damper shutoff member is merged, along with a filling member, into a combined filling valve which is integrated into the damper connection block, and wherein the damper shutoff member comprises a central through-hole which constitutes the filling member in the combined filling valve, a method for assembling the hydraulic system comprises the step of:

prefilling with a hydraulic medium a hydraulic line volume of the hydraulic line and a hydraulic damper volume of the damper before the damper and/or the hydraulic line are preassembled or assembled.

9. The method according to claim 8, wherein the hydraulic line volume of the hydraulic line and the hydraulic damper volume of the damper are filled with a hydraulic medium only after preassembly or assembly of the damper and/or the hydraulic line.

* * * * *